United States Patent
Yoo et al.

(10) Patent No.: US 11,409,047 B2
(45) Date of Patent: Aug. 9, 2022

(54) OPTICAL COUPLING METHOD AND APPARATUS

(71) Applicant: Electronics and Telecommunications Research Institute, Daejeon (KR)

(72) Inventors: Sanghwa Yoo, Daejeon (KR); Sae-Kyoung Kang, Daejeon (KR); Heuk Park, Daejeon (KR); Joon Young Huh, Daejeon (KR); Jongtae Song, Daejeon (KR); Joon Ki Lee, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 10 days.

(21) Appl. No.: 17/094,465

(22) Filed: Nov. 10, 2020

(65) Prior Publication Data
US 2021/0141157 A1    May 13, 2021

(30) Foreign Application Priority Data

Nov. 13, 2019 (KR) .................. 10-2019-0145114
May 12, 2020 (KR) .................. 10-2020-0056538

(51) Int. Cl.
| G02B 6/34 | (2006.01) |
| G02B 6/30 | (2006.01) |
| G02B 6/124 | (2006.01) |
| G02B 6/13 | (2006.01) |
| F21V 8/00 | (2006.01) |
| G02B 6/42 | (2006.01) |

(52) U.S. Cl.
CPC ............ *G02B 6/34* (2013.01); *G02B 6/124* (2013.01); *G02B 6/13* (2013.01); *G02B 6/30* (2013.01); *G02B 6/0006* (2013.01); *G02B 6/4214* (2013.01); *G02B 6/4225* (2013.01)

(58) Field of Classification Search
CPC .......... G02B 6/0006; G02B 6/13; G02B 6/30; G02B 6/34; G02B 6/124; G02B 6/4214; G02B 6/4225
USPC ........................................................ 385/14
See application file for complete search history.

(56) References Cited

U.S. PATENT DOCUMENTS

| 7,162,124 B1 | 1/2007 | Gunn, III et al. |
| 7,664,357 B2 | 2/2010 | Song et al. |
| 9,453,969 B2 | 9/2016 | Kobyakov et al. |
| 9,746,617 B2 * | 8/2017 | Dumais ................. G02B 6/305 |
| 10,042,131 B1 | 8/2018 | Lesea |
| 10,527,796 B2 | 1/2020 | Spannagel et al. |
| 2011/0135252 A1 | 6/2011 | Kim et al. |
| 2012/0092650 A1 * | 4/2012 | Gunn, III ........... G02B 6/29338 356/402 |

OTHER PUBLICATIONS

Frederik Van Laere et al., "Compact Focusing Grating Couplers for Silicon-on-Insulator Integrated Circuits", IEEE Photonics Technology Letters, Dec. 1, 2007, pp. 1919-1921, vol. 19, No. 23.

* cited by examiner

*Primary Examiner* — Michael P Mooney
(74) *Attorney, Agent, or Firm* — Kile Park Reed & Houtteman PLLC

(57) ABSTRACT

An optical coupling method and apparatus are disclosed. The optical coupling method improve the speed of optical alignment between an optical fiber and a grating coupler (GC) of an optical coupling apparatus for a characteristic test of a silicon photonic integrated circuit (Si-PIC) chip by using a reflective grating couplers disposed on the Si-PIC chip.

10 Claims, 15 Drawing Sheets

100

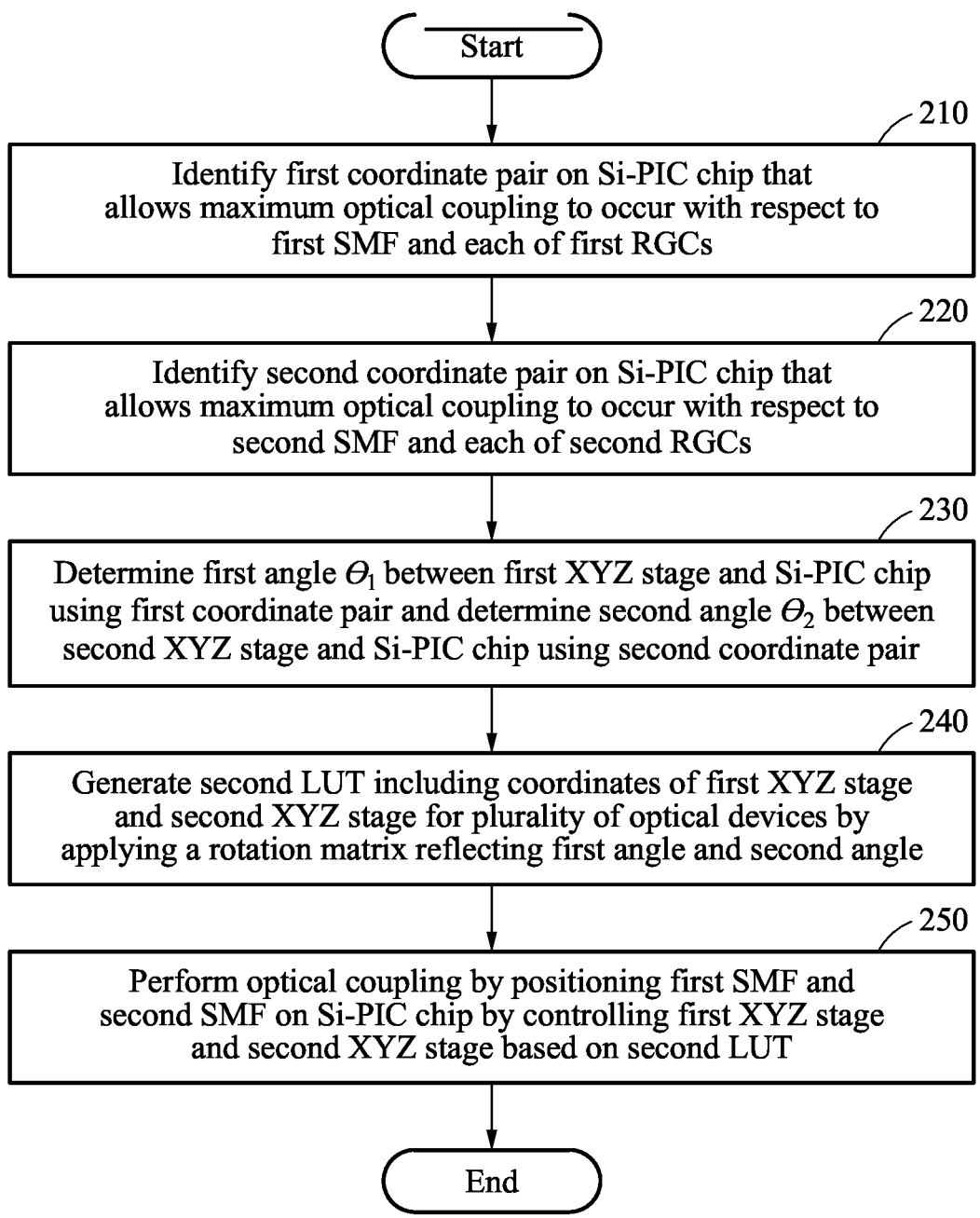

400

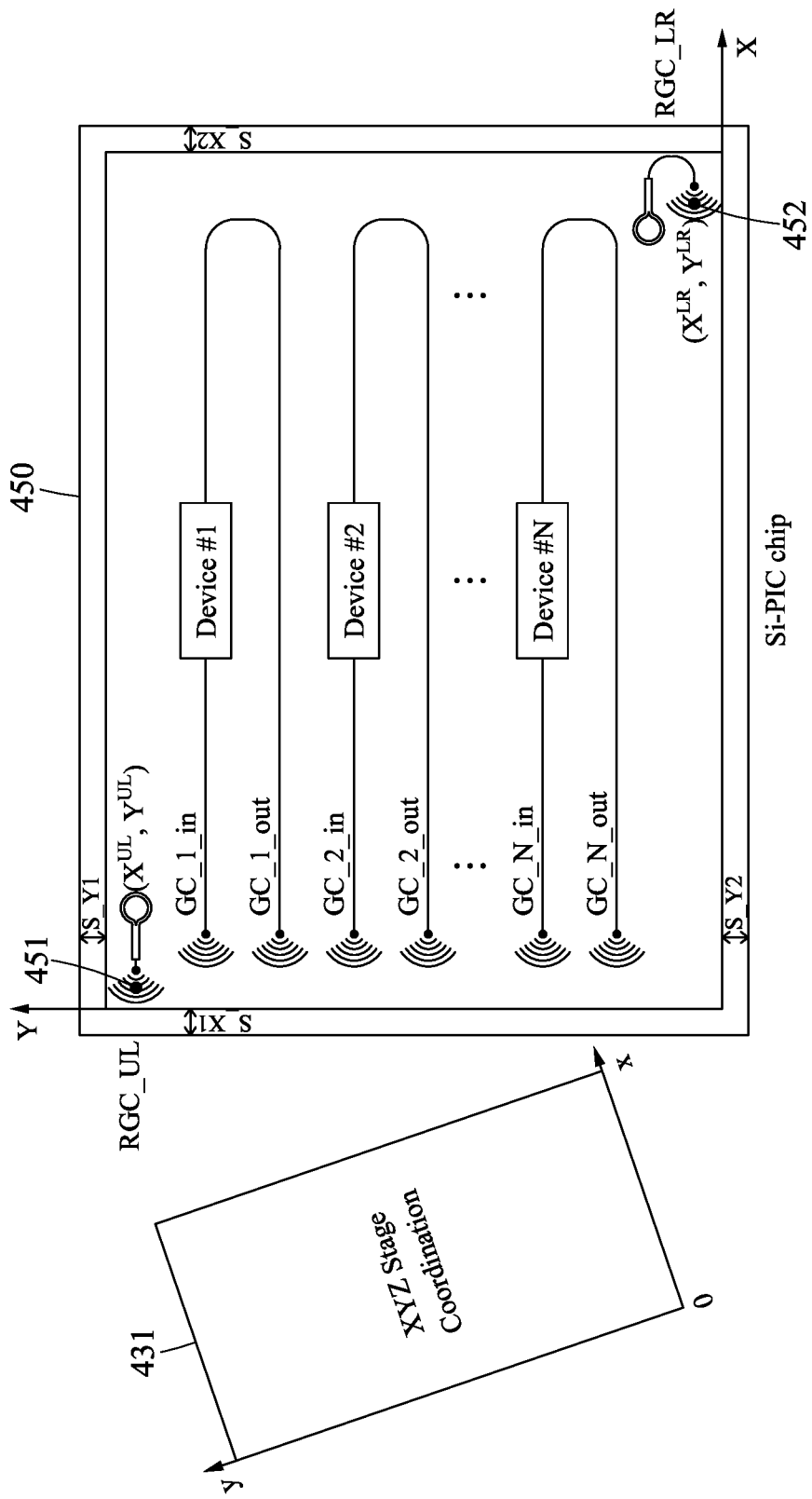

OPTICAL COUPLING METHOD AND APPARATUS

CROSS-REFERENCE TO RELATED APPLICATION(S)

This application claims the benefit of Korean Patent Application No. 10-2019-0145114, filed on Nov. 13, 2019, and Korean Patent Application No. 10-2020-0056538, filed on May 12, 2020, in the Korean Intellectual Property Office, the disclosures of which are incorporated herein by reference.

BACKGROUND

1. Field of the Invention

Example embodiments relate to an optical coupling method and apparatus, more particularly, to a method and apparatus for optical coupling between an optical fiber and a silicon photonics chip.

2. Description of the Related Art

In recent days, a silicon photonic integrated circuit (Si-PIC) technology through which several optical devices are integrated into a single silicon chip has been starting to receive great attention. #1 to #N optical devices included in an Si-PIC chip each has a device that performs a function of optical coupling with the outside of the chip, and a grating coupler (GC) is generally used as the device. The GC may be optically aligned while maintaining an angle $\theta_{GC}$ to obtain the maximum coupling efficiency with an external single-mode optical fiber (SMF), and the angle $\theta_{GC}$ may have a value of 8° to 10°. Light outputted from the end of the SMF is inputted through the GC of the Si-PIC chip, passes through the optical device, and then is outputted to the SMF through the GC.

Here, optical alignment between the SMF and the GC can be performed through an XYZ stage. However, there is a problem in that the Si-PIC chip on which the GC is disposed and a coordinate axis on which the XYZ stage moves cannot be completely matched in parallel, and thus a lot of time and effort may be required for optical alignment between the SMF and the GC.

SUMMARY

An aspect provides a method and apparatus for improving the speed of optical alignment between an optical fiber and a grating coupler (GC) of an optical coupling apparatus for a characteristic test of a silicon photonic integrated circuit (Si-PIC) chip.

According to an aspect, there is provided an optical coupling method including identifying, by using a pair of first reflective grating couplers (RGCs) disposed on a silicon photonics chip in an XY scanning process of a first stage, a first coordinate pair on the silicon photonics chip that allows maximum optical coupling to occur with respect to a first optical fiber and each of the first RGCs, identifying, by using a pair of second RGCs different from the first RGCs in an XY scanning process of a second stage, a second coordinate pair on the silicon photonics chip that allows maximum optical coupling to occur with respect to a second optical fiber and each of the second RGCs, determining a first angle between the first stage and the silicon photonics chip by using the identified first coordinate pair, and determining a second angle between the second stage and the silicon photonics chip by using the identified second coordinate pair, and generating, by applying the determined first angle and second angle to a first lookup table (LUT) including layout coordinates for a plurality of optical devices disposed on the silicon photonics chip, a second LUT including coordinates of the first stage and the second stage for the plurality of optical devices.

The identifying of the first coordinate pair may include, when an optical signal outputted through a light source in the XY scanning process of the first stage is reflected by each of the first RGCs on the silicon photonics chip and received by a photodiode, determining points on the silicon photonics chip having a largest received optical signal intensity as the first coordinate pair.

The identifying of the second coordinate pair may include, when an optical signal outputted through a light source in the XY scanning process of the second stage is reflected by each of the second RGCs on the silicon photonics chip and received by a photodiode, determining points on the silicon photonics chip having a largest received optical signal intensity as the second coordinate pair.

The generating of the second LUT may include applying a rotation matrix reflecting the determined first angle and second angle to the first LUT.

Each of the first RGCs and the second RGCs may be disposed on the silicon photonics chip such that distances are the furthest.

Each of the first RGCs and the second RGCs may have a loopback type structure including a GC and an optical coupler with two outputs connected into one.

The optical coupling method may further include performing optical coupling by positioning the first optical fiber and the second optical fiber at input and output GCs for a plurality of optical devices disposed on the silicon photonics chip by controlling the first stage and the second stage through the generated second LUT.

According to another aspect, there is provided an optical coupling apparatus including a processor. The processor may be configured to identify, by using a pair of first RGCs disposed on a silicon photonics chip in an XY scanning process of a first stage, a first coordinate pair on the silicon photonics chip that allows maximum optical coupling to occur with respect to a first optical fiber and each of the first RGCs, identify, by using a pair of second RGCs different from the first RGCs in an XY scanning process of a second stage, a second coordinate pair on the silicon photonics chip that allows maximum optical coupling to occur with respect to a second optical fiber and each of the second RGCs, determine a first angle between the first stage and the silicon photonics chip by using the identified first coordinate pair, and determine a second angle between the second stage and the silicon photonics chip by using the identified second coordinate pair, and generate, by applying the determined first angle and second angle to a first LUT including layout coordinates for a plurality of optical devices disposed on the silicon photonics chip, a second LUT including coordinates of the first stage and the second stage for the plurality of optical devices.

When an optical signal outputted through a light source in the XY scanning process of the first stage is reflected by each of the first RGCs on the silicon photonics chip and received by a photodiode, the processor may determine points on the silicon photonics chip having a largest received optical signal intensity as the first coordinate pair.

When an optical signal outputted through a light source in the XY scanning process of the second stage is reflected by each of the second RGCs on the silicon photonics chip and received by a photodiode, the processor may determine points on the silicon photonics chip having a largest received optical signal intensity as the second coordinate pair.

The processor may generate a second LUT by applying a rotation matrix reflecting the determined first angle and second angle to the first LUT.

Each of the first RGCs and the second RGCs may be disposed on the silicon photonics chip such that distances are the furthest.

Each of the first RGCs and the second RGCs may have a loopback type structure including a GC and an optical coupler with two outputs connected into one.

The processor may perform optical coupling by positioning the first optical fiber and the second optical fiber at input and output GCs of a plurality of optical devices disposed on the silicon photonics chip by controlling the first stage and the second stage through the generated second LUT.

According to still another aspect, there is provided an optical coupling method including identifying, by using a pair of RGCs disposed on a silicon photonics chip in an XY scanning process of a stage, a coordinate pair on the silicon photonics chip that allows maximum optical coupling to occur with respect to any one optical fiber included in an optical fiber array and each of the RGCs, determining an angle between the stage and the silicon photonics chip by using the identified coordinate pair, rotating the stage such that the angle between the stage and the silicon photonics chip becomes "0" based on the determined angle, obtaining position information on one of the pair of RGCs through the XY scanning process of the stage in which the rotation is performed, and performing optical coupling by positioning the optical fiber array at input and output GCs for a plurality of optical devices disposed on the silicon photonics chip by controlling the stage in which the rotation is performed based on the obtained position information.

The identifying of the coordinate pair may include, when an optical signal outputted through a light source in the XY scanning process of the stage is reflected by each of the RGCs on the silicon photonics chip and received by a photodiode, determining points on the silicon photonics chip having a largest received optical signal intensity as the coordinate pair.

The RGCs may be disposed on the silicon photonics chip such that a distance between the RGCs is the furthest.

The RGCs may have a loopback type structure including a GC and an optical coupler with two outputs connected into one.

According to still another aspect, there is provided an optical coupling apparatus including a processor. The processor may be configured to identify, by using a pair of RGCs disposed on a silicon photonics chip in an XY scanning process of a stage, a coordinate pair on the silicon photonics chip that allows maximum optical coupling to occur with respect to any one optical fiber included in an optical fiber array and each of the RGCs, determine an angle between the stage and the silicon photonics chip by using the identified coordinate pair, rotate the stage such that the angle between the stage and the silicon photonics chip becomes "0" based on the determined angle, obtain position information on one of the pair of RGCs through the XY scanning process of the stage in which the rotation is performed, and perform optical coupling by positioning the optical fiber array at input and output GCs for a plurality of optical devices disposed on the silicon photonics chip by controlling the stage in which the rotation is performed based on the obtained position information.

When an optical signal outputted through a light source in the XY scanning process of the stage is reflected by each of the RGCs on the silicon photonics chip and received by a photodiode, the processor may determine points on the silicon photonics chip having a largest received optical signal intensity as the coordinate pair.

Additional aspects of example embodiments will be set forth in part in the description which follows and, in part, will be apparent from the description, or may be learned by practice of the disclosure.

Example embodiments may use an RGC disposed on an Si-PIC chip in an optical coupling apparatus for a characteristic test of the Si-PIC chip, thereby improving the speed of optical alignment between an optical fiber and a GC.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 2 is a flowchart illustrating an optical coupling method according to an example embodiment.

FIGS. 4A to 4D are diagrams illustrating another example of an optical coupling method according to an example embodiment.

DETAILED DESCRIPTION

Hereinafter, example embodiments will be described in detail with reference to the accompanying drawings.

FIGS. 1A to 1G are diagrams illustrating an optical alignment system according to an example embodiment.

Figure 1A:
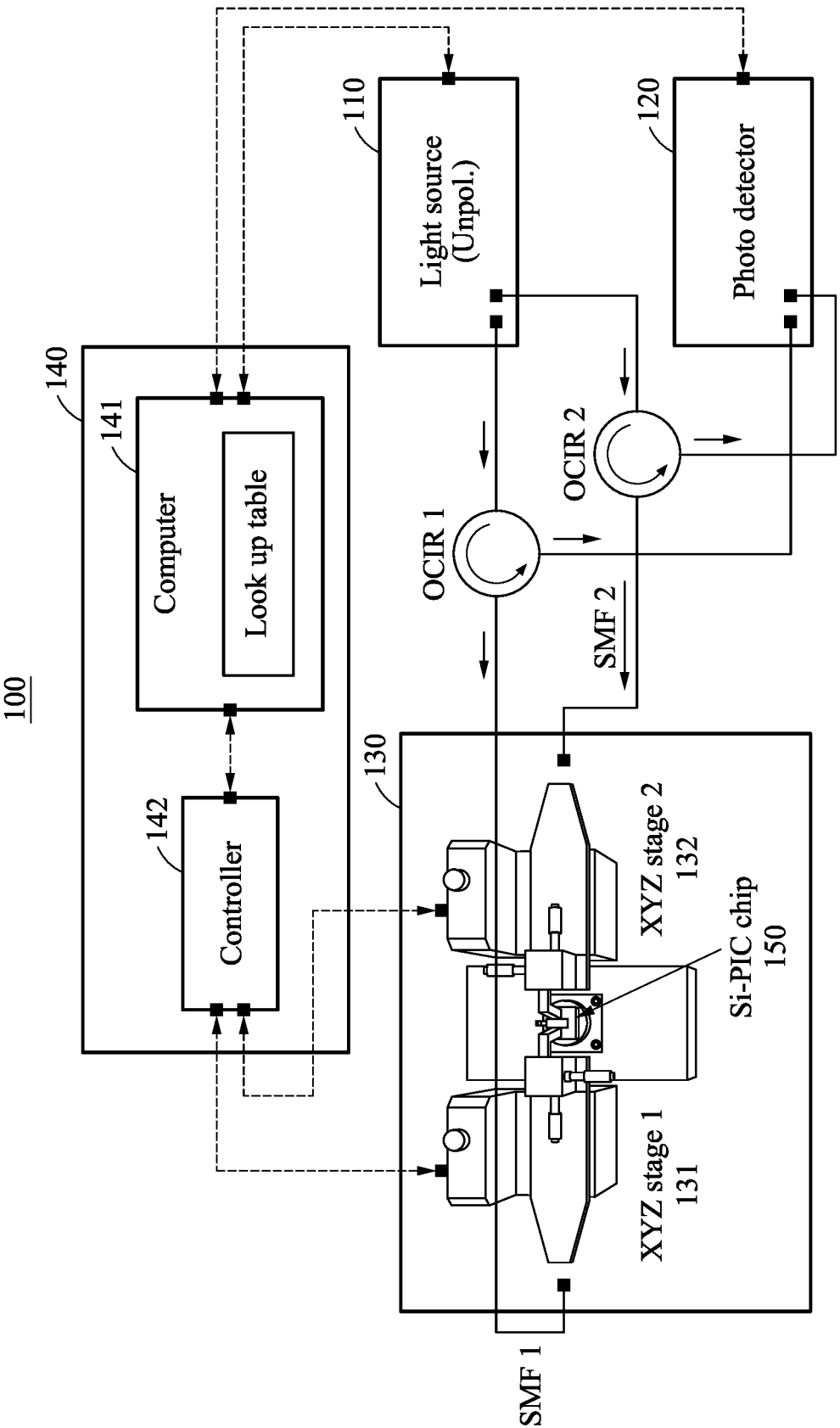
FIGS. 1A to 1G are diagrams illustrating an optical alignment system according to an example embodiment.

Specifically, FIG. 1A is a diagram illustrating a configuration of an optical coupling apparatus 100 for aligning an optical fiber to a grating coupler (GC)-based silicon photonic integrated circuit (Si-PIC) chip according to an example embodiment. Referring to FIG. 1A, the optical coupling apparatus 100 may include a light source 110, a photo detector (PD) 120, a stage unit 130, and a control unit 140. Specifically, the light source 110 and the PD 120 may transmit and receive an optical signal for finding an optimal position for optical coupling between a Si-PIC chip 150 and an optical fiber. The stage unit 130 may align the optical fiber to a GC of the Si-PIC chip 150 for optical coupling between the external optical fiber and the Si-PIC chip 150 by using a first XYZ stage 131 and a second XYZ stage 132. The control unit 140 may include a computer 141 and a controller 142. The computer 141 may control movements of the first XYZ stage 131 and the second XYZ stage 132 through the controller 142 by using a lookup table (LUT) in which layout coordinates for optical devices on the Si-PIC chip 150 are recorded.

Figure 1B:
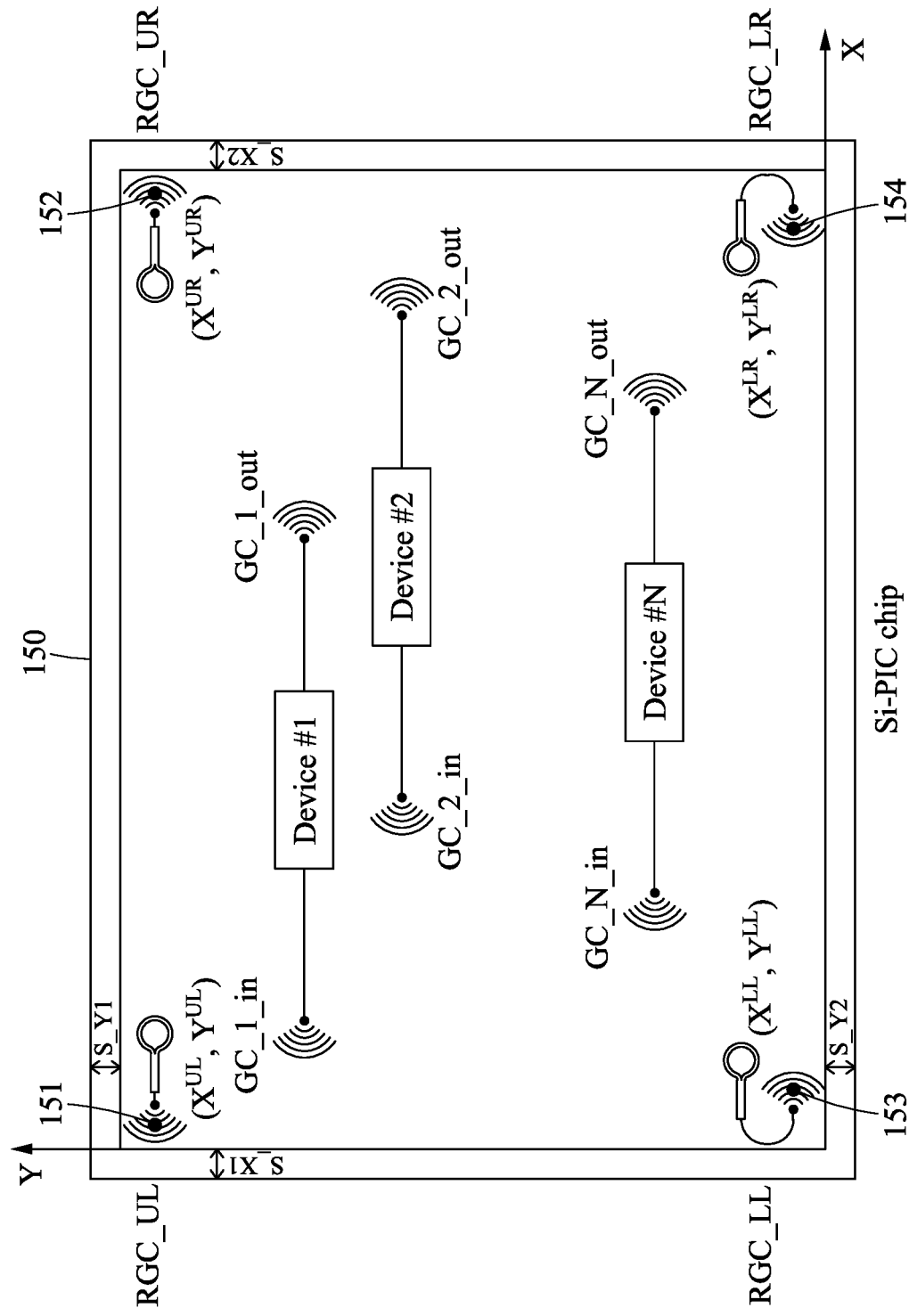

FIG. 1B is a diagram illustrating a configuration of the Si-PIC chip 150 according to an example embodiment. Referring to FIG. 1B, the Si-PIC chip 150 according to an example embodiment may include four reflective grating couplers (RGCs), that is, RGC_upper & left (UL) 151, RGC_upper & right (UR) 152, RGC_lower & left (LL) 153, and RGC_lower & right (LR) 154 to correct optical alignment axes of the first XYZ stage 131 and the second XYZ stage 132.

The above-described four RGCs 151 to 154 may be spaced at predetermined intervals S_X1, S_X2, S_Y1, and S_Y2 on an outer side of the Si-PIC chip 150 to provide a margin from chip cracking. Here, the four RGCs 151 to 154 may have a loopback type structure including a GC and a 1×2 multimode interference (MMI) optical coupler in which two outputs are connected to each other. However, the structures of the RGCs 151 to 154 are not limited to the above-described loopback type structure, and has been described as one possible implementation example.

The RGCs 151 to 154 may be implemented in a compact size by using a cone-shaped focusing type GC, as illustrated in FIG. 1B. However, the RGCs 151 to 154 may use a rectangular GC rather than the cone-shaped focusing type GC, but there may be a short-coming in that it is required to include 100 µm or more tapering in the case of using the rectangular GC. This is because it is required to use a taper that is gradually capable to change a width due to a silicon GC generally having a width of 10 µm and a silicon waveguide having a width 0.5 µm.

In order to correct an optical alignment axis between the first XYZ stage 131 and the Si-PIC chip 150, the RGC_UL 151 and the RGC_LR 154 may be respectively disposed at diagonal positions furthest from each other on the Si-PIC chip 150 while forming a pair with each other. Here, since the GC needs to form an angle $\theta_{GC}$ with the optical fiber, directions in which the RGC_UL 151 and the RGC_LR 154 face may be the same. In the same way, in order to correct an optical alignment axis between the second XYZ stage 132 and the Si-PIC chip 150, the RGC_UR 152 and the RGC_LL 153 may be respectively disposed at diagonal positions furthest from each other on the Si-PIC chip 150 while forming a pair with each other. That is, the four RGCs 151 to 154 may be respectively disposed at vertices ($X^{UL}$, $Y^{UL}$), ($X^{LR}$, $Y^{LR}$), ($X^{UE}$, $Y^{UR}$), ($X^{LL}$, $Y^{LL}$) of the Si-PIC chip 150, as illustrated in FIG. 1B.

Figure 1C:
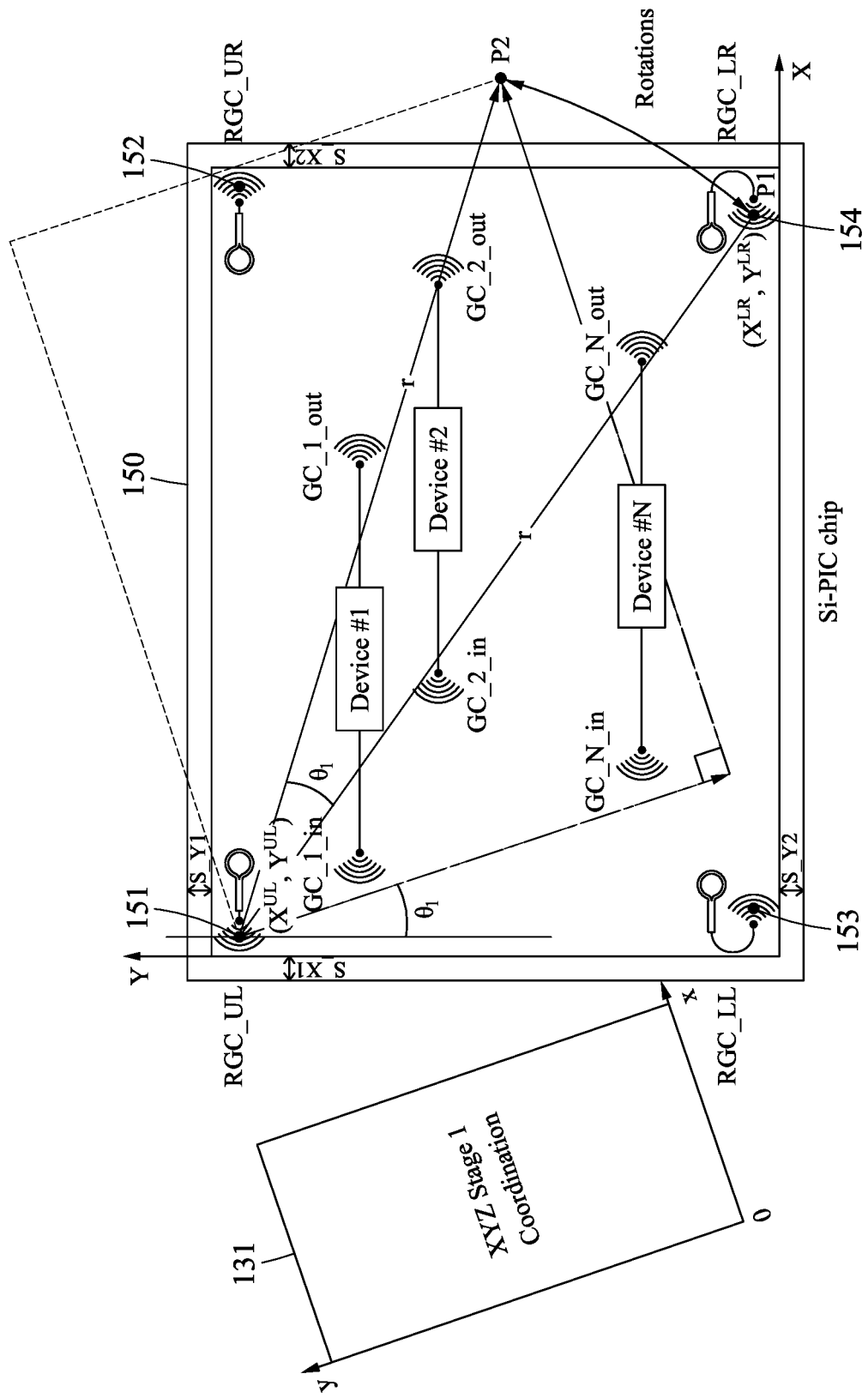
Figure 1D:
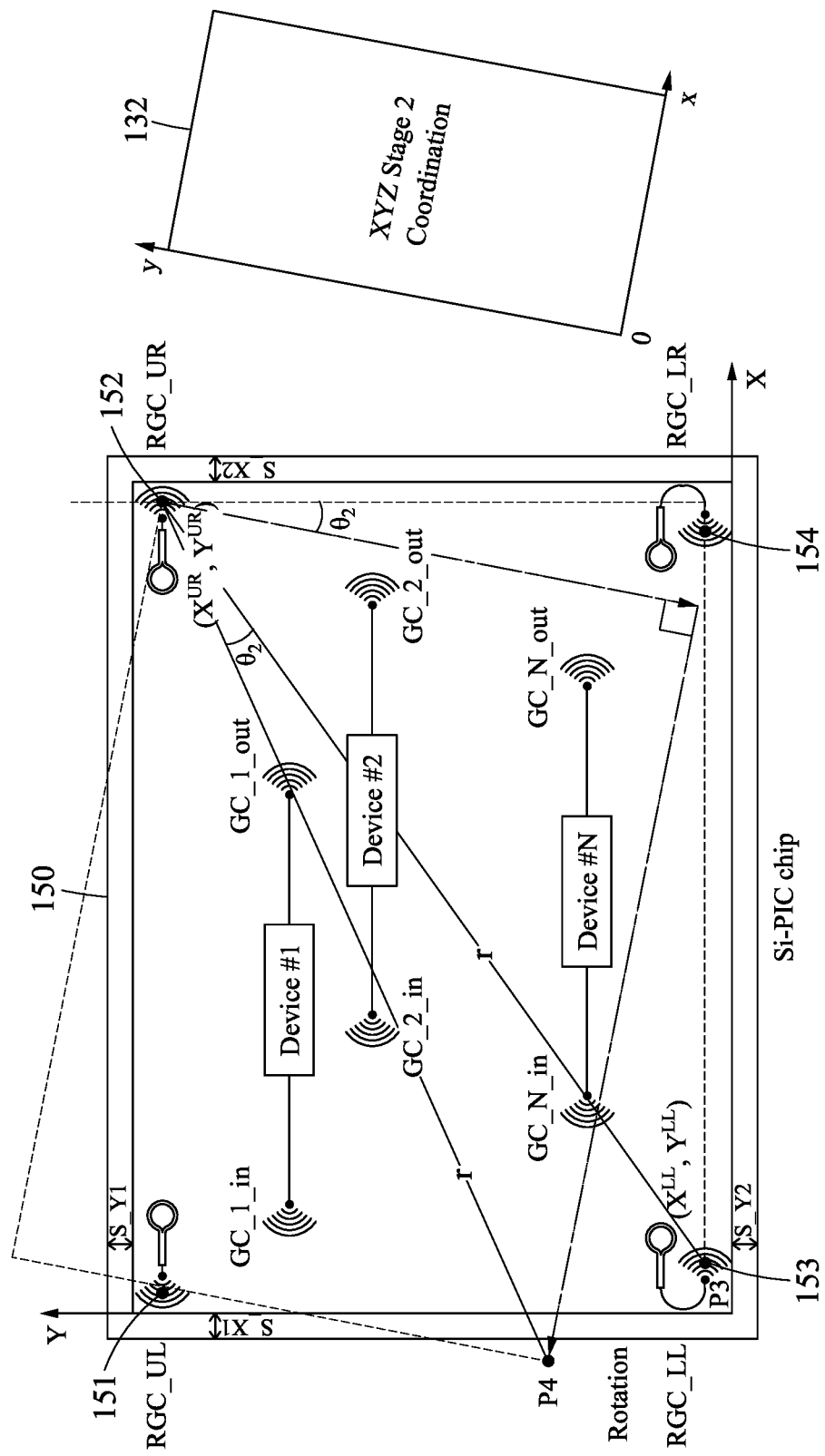
Figure 1E:
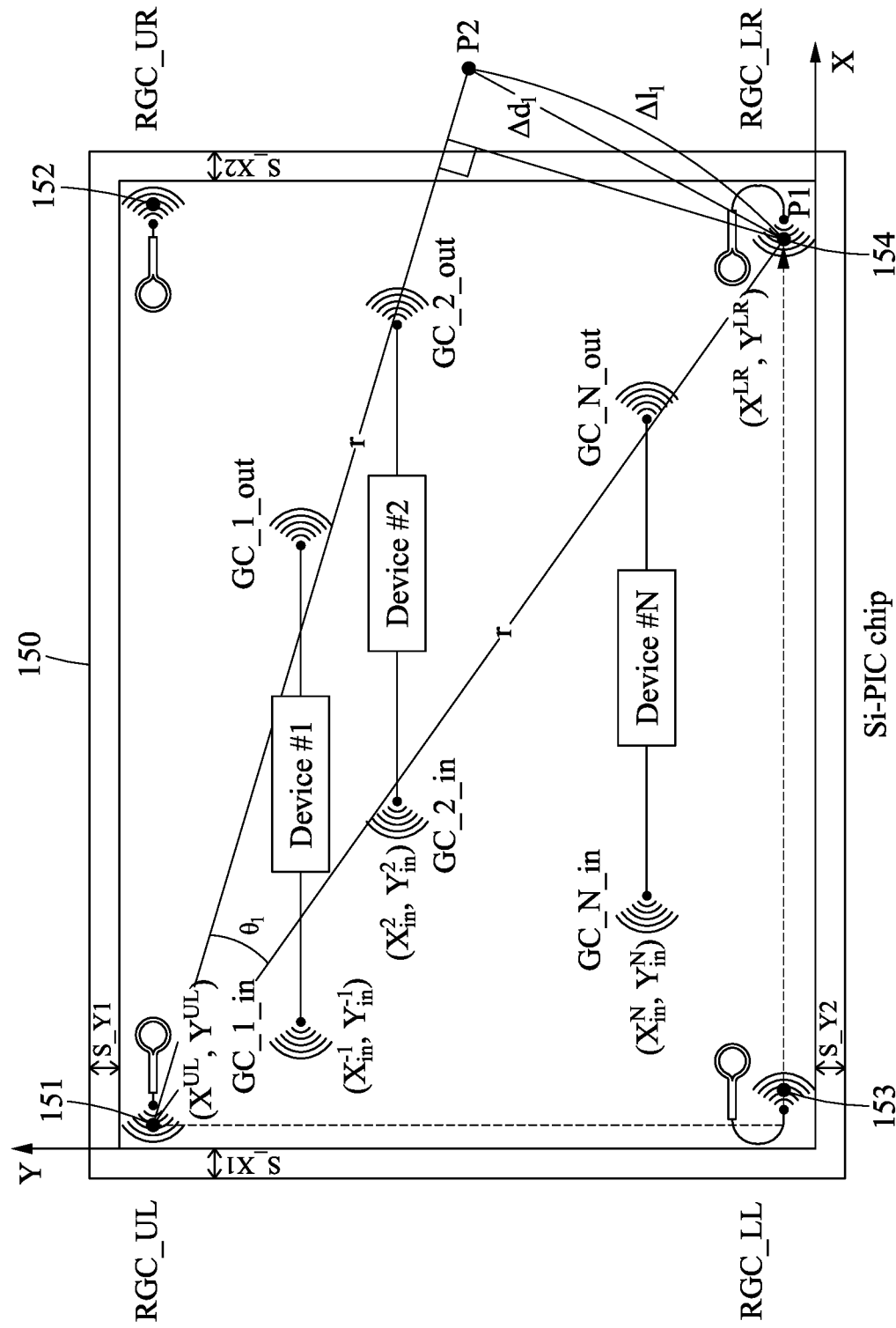
Figure 1F:
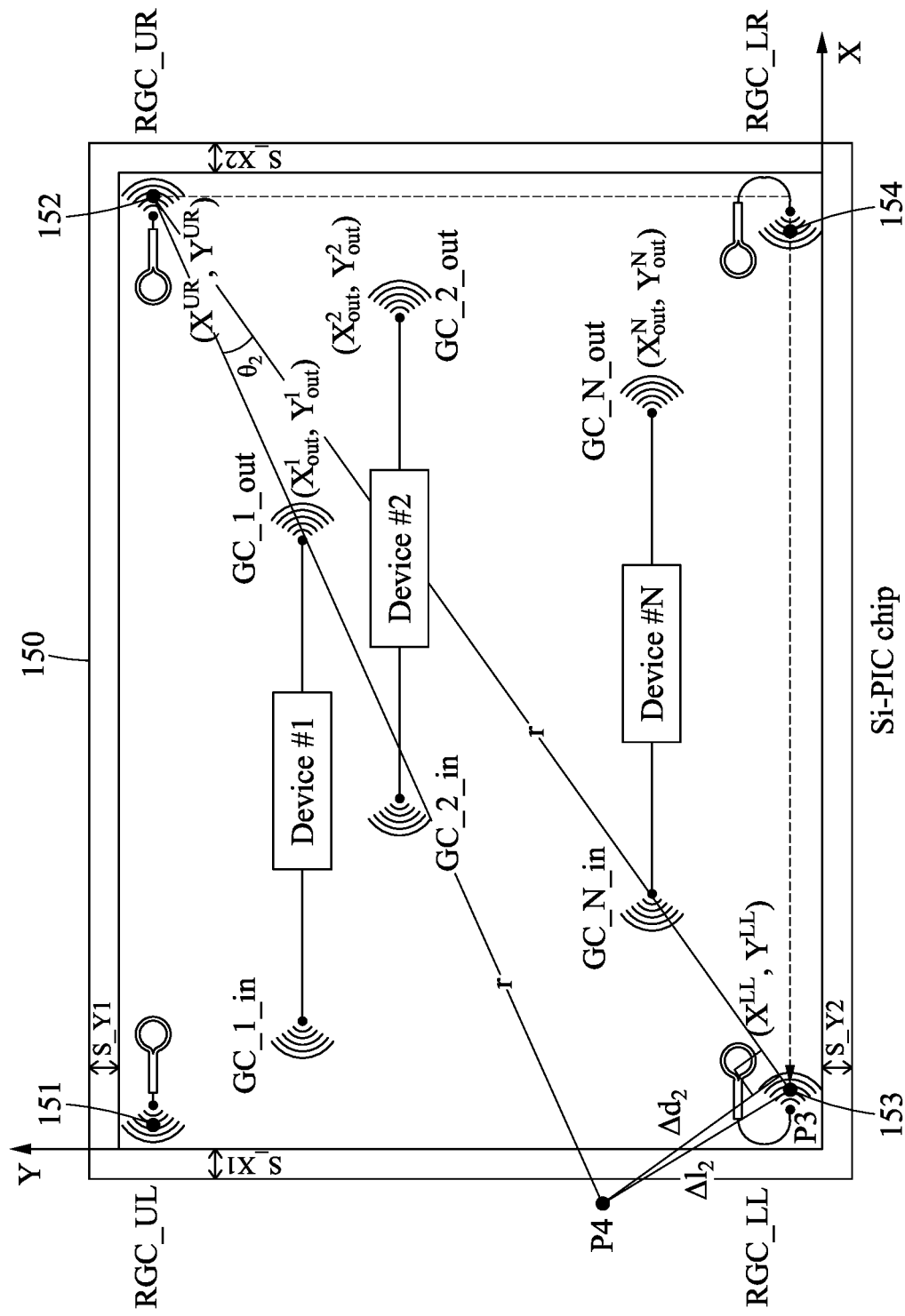

FIG. 1C is a diagram illustrating optical coupling at the RGC_UL and the RGC_LR indicated by coordinates of the first XYZ stage according to an example embodiment, and FIG. 1D is a diagram illustrating optical coupling at the RGC_UR and the RGC_LL indicated by coordinates of the second XYZ stage according to an example embodiment. FIG. 1E is a diagram illustrating optical coupling at the RGC_UL and the RGC_LR indicated by layout coordinates according to an example embodiment, and FIG. 1F is a diagram illustrating optical coupling at the RGC_UR and the RGC_LL indicated by layout coordinates according to an example embodiment.

In order to facilitate the description of example embodiments, layout coordinates on the Si-PIC chip 150 are capitalized as (X,Y), and coordinates of axes of the first XYZ stage 131 and the second XYZ stage 132 are lowercased as (x,y). In addition, it is assumed that the high-precision first XYZ stage 131 and second XYZ stage 132 are guaranteed to be respectively perpendicular to the axes.

Referring to FIG. 1C, when the optical coupling apparatus 100 optically aligns a first single-mode optical fiber (SMF) SMF1 to coordinates ($X^{UL}$, $Y^{UL}$) of the RGC_UL 151 through XY scanning, and then applies a voltage or current corresponding to $\Delta X = X^{UL} - X^{LR}$ and $\Delta Y = Y^{UL} - Y^{LR}$ to the first XYZ stage 131 in order to move back to coordinates ($X^{LR}$, $Y^{LR}$) of the RGC_LR 154, the optical alignment axis between the first XYZ stage 131 and the Si-PIC chip 150 may be twisted by $\theta_1$, and thus the first SMF SMF1 may arrive at point P2 rather than point P1. In order to correct the optical alignment axis, it is required to obtain $\theta_1$ first.

To this end, when the first SMF SMF1 is optically aligned to the RGC_UL 151, the computer 141 of the optical coupling apparatus 100 may store XY coordinates ($x^{UL}$, $y^{UL}$) of the first XYZ stage 131. In addition, when the first SMF SMF1 is optically aligned to the RGC_LR 154 through XY scanning, the computer 141 may store XY coordinates ($x^{LR}$, $y^{LR}$) of the first XYZ stage 131.

In the same way, in order to obtain $\theta_2$ in FIG. 2D, the computer 141 may optically align a second SMF SMF2 to the RGC_UR 152 and the RGC_LL 153 through XY scanning to store XY coordinates ($x^{UR}$, $y^{UR}$), ($x^{LL}$, $y^{LL}$), respectively.

Thereafter, the computer 141 of the optical coupling apparatus 100 may use Equations 1 and 2 below to calculate the angle $\theta_1$ between the first XYZ stage 131 and the Si-PIC chip 150, and an angle $\theta_2$ between the second XYZ stage 132 and Si-PIC chip 150.

First XYZ stage: $$\begin{bmatrix} x^{UL} - x^{LR} \\ y^{UL} - y^{LR} \end{bmatrix} = \begin{bmatrix} \cos\theta_1 & -\sin\theta_1 \\ \sin\theta_1 & \cos\theta_1 \end{bmatrix} \begin{bmatrix} X^{UL} - X^{LR} \\ Y^{UL} - Y^{LR} \end{bmatrix}$$ [Equation 1]

Second XYZ stage: $$\begin{bmatrix} x^{UR} - x^{LL} \\ y^{UR} - y^{LL} \end{bmatrix} = \begin{bmatrix} \cos\theta_2 & -\sin\theta_2 \\ \sin\theta_2 & \cos\theta_2 \end{bmatrix} \begin{bmatrix} X^{UR} - X^{LL} \\ Y^{UR}_{out} - Y^{LL}_{out} \end{bmatrix}$$ [Equation 2]

In addition, the computer 141 of the optical coupling apparatus 100 may update a LUT in which layout coordinates of #1 to #N optical devices disposed on the Si-PIC chip 150 are recorded as illustrated in FIGS. 1E and 1F by using a rotation matrix reflecting the calculated angles $\theta_1$ and $\theta_2$ to generate a new LUT including coordinates of the first XYZ stage 131 and coordinates of the second XYZ stage 132 as shown in Equations 3 and 4 below.

New coordinates of first XYZ stage: $$\begin{bmatrix} x^N_{in} - x^{UL} \\ y^N_{in} - y^{UL} \end{bmatrix} = \begin{bmatrix} \cos\theta_1 & -\sin\theta_1 \\ \sin\theta_1 & \cos\theta_1 \end{bmatrix} \begin{bmatrix} X^N_{in} - X^{UL} \\ Y^N_{in} - Y^{UL} \end{bmatrix}$$ [Equation 3]

New coordinates of second XYZ stage: $$\begin{bmatrix} x^N_{out} - x^{UR} \\ y^N_{out} - y^{UR} \end{bmatrix} = \begin{bmatrix} \cos\theta_2 & -\sin\theta_2 \\ \sin\theta_2 & \cos\theta_2 \end{bmatrix} \begin{bmatrix} X^N_{out} - X^{UR} \\ Y^N_{out} - Y^{UR} \end{bmatrix}$$ [Equation 4]

Accordingly, LUTs before and after updating may be shown in Table 1 below.

TABLE 1

|  | LUT before updating | | LUT after updating | |
| --- | --- | --- | --- | --- |
|  | First XYZ stage | Second XYZ stage | First XYZ stage | Second XYZ stage |
| RGC_UL | ($X^{UL}$, $Y^{UL}$) | — | ($x^{UL}$, $y^{UL}$) | — |
| RGC_LR | ($X^{LR}$, $Y^{LR}$) | — | ($x^{LR}$, $y^{LR}$) | — |
| RGC_UR | — | ($X^{UR}$, $Y^{UR}$) | — | ($x^{UR}$, $y^{UR}$) |
| RGC_LL | — | ($X^{LL}$, $Y^{LL}$) | — | ($x^{LL}$, $y^{LL}$) |

TABLE 1-continued

| | LUT before updating | | LUT after updating | |
|---|---|---|---|---|
| | First XYZ stage | Second XYZ stage | First XYZ stage | Second XYZ stage |
| #1 Device | $(X_{in}^1, Y_{in}^1)$ | $(X_{out}^1, Y_{out}^1)$ | $(x_{in}^1, y_{in}^1)$ | $(x_{out}^1, y_{out}^1)$ |
| #2 Device | $(X_{in}^2, Y_{in}^2)$ | $(X_{out}^2, Y_{out}^2)$ | $(x_{in}^2, y_{in}^2)$ | $(x_{out}^2, y_{out}^2)$ |
| ... | ... | ... | ... | ... |
| #N Device | $(X_{in}^N, Y_{in}^N)$ | $(X_{out}^N, Y_{out}^N)$ | $(x_{in}^N, y_{in}^N)$ | $(x_{out}^N, y_{out}^N)$ |

In FIG. 1E, $\theta_1$ may be represented by Equation 5 below.

$$\theta_1 = \frac{\Delta l_1}{r} \sim \frac{\Delta d_1}{r} \quad \text{[Equation 5]}$$

Here, r may represent a distance between the RGC_UL 151 and the RGC_LR 154, and $\Delta d_1$ may represent a distance caused by the twist of the optical alignment axis between the first XYZ stage 131 and the Si-PIC chip 150. In the same way, in FIG. 1F, $\theta_2$ may be represented by Equation 6 below.

$$\theta_2 = \frac{\Delta l_2}{r} \sim \frac{\Delta d_2}{r} \quad \text{[Equation 6]}$$

Figure 1G:
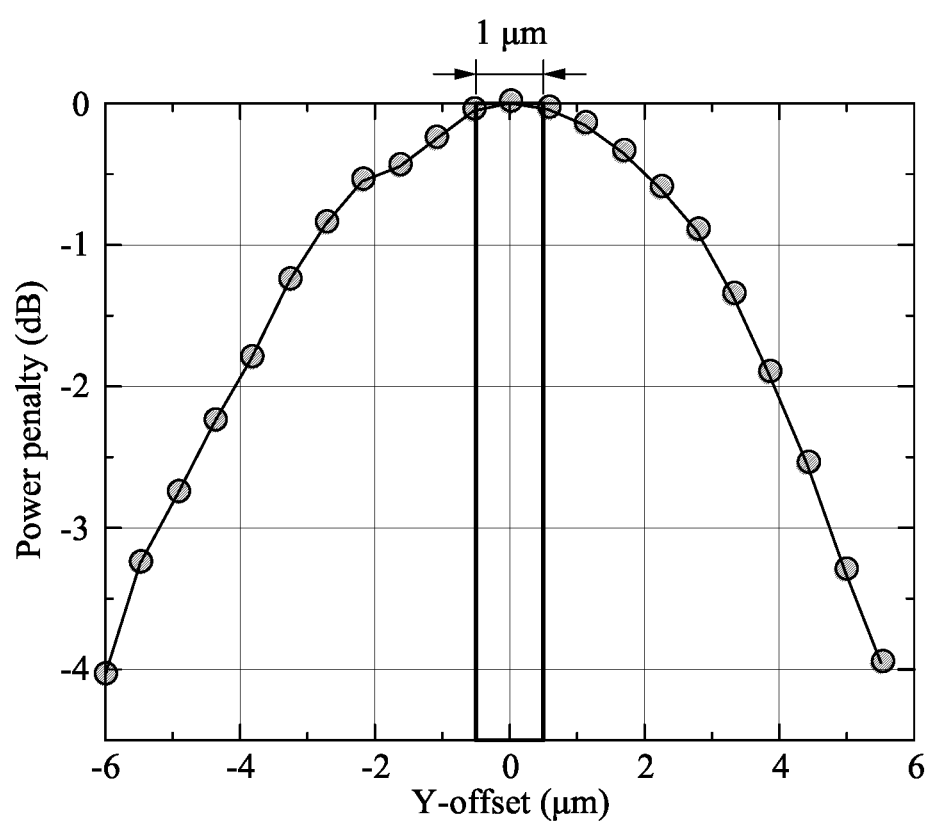

FIG. 1G illustrates a result of measuring optical power penalty according to a distance at a position where maximum optical coupling occurs between the SMF and the GC on the Si-PIC chip 150 according to an example embodiment. Referring to FIG. 1G, it can be discerned that there is a slight optical power difference of 0.1 dB or less at a distance of ±0.5 μm. Therefore, even when the axis between the first XYZ stage 131 and the Si-PIC chip 150 are twisted, there may be difficulty in measuring optical power at a distance of ±0.5 μm or less and correcting an XY position. This is because light coupled between the SMF and the GC has a mode field diameter (MFD) of several micrometers.

When a distance corresponding to a distinguishable optical power difference is represented as $\Delta d_{min}$, the angular resolution of the optical coupling method according to example embodiments may be represented as $\theta_{res} \sim \Delta d_{min}/r$. In general, the GC may be designed such that $\Delta d_{min}$ has a large value because the GC is required to have durability due to misalignment. Therefore, in order to have high angular resolution, it is required to lengthen r to the maximum.

For this reason, in the optical coupling method according to example embodiments, the RGC_UL 151 and the RGC_LR 154 may be disposed to be positioned on a diagonal line on the Si-PIC chip 150, and the RGC_UR 152 and the RGC_LL 153 may be disposed to be positioned on another diagonal line. For example, when the RGC_UL 151 and the RGC_LR 154 are disposed to be positioned on a diagonal line that is a furthest distance therebetween on the Si-PIC chip 150, correctable angular resolution may be represented as $\theta_{res}$. Here, when a distance between the RGC_UL 151 and the RGC_LR 154 is two times shorter than a distance of the diagonal line, the angular resolution may be proportionally increased to $2 \times \theta_{res}$, which may lead to a result that the accuracy of angle correction is two times worse.

FIG. 2 is a flowchart illustrating an optical coupling method according to an example embodiment.

In operation 210, the optical coupling apparatus 100 may identify, by using a pair of the first RGCs 151 and 154 disposed on the Si-PIC chip 150 in an XY scanning process of the first XYZ stage 131, a first coordinate pair on the Si-PIC chip 150 that allows maximum optical coupling to occur with respect to a first SMF SMF1 and each of the first RGCs 151 and 154.

Specifically, the optical coupling apparatus 100 may move the first XYZ stage 131 to a preset initial position in order to optically couple the first SMF SMF1 and the RGC_UL 151 with each other. An unpolarized (unpol.) optical signal having a wide wavelength band outputted from the light source 110 may be inputted to a first optical circulator (OCIR) OCIR1 to be inputted to the Si-PIC chip 150 through the first SMF SMF1. Since a general GC has a characteristic that coupling efficiency varies depending on the wavelength and polarization, an unpolarized light source having a wide wavelength band may be used to perform an operation independent of the characteristic.

The optical signal reflected from the Si-PIC chip 150 may be inputted to the PD 120 through the first SMF SMF1 and the first OCIR OCIR1 again. The optical power measured by the PD 120 may be stored in the computer 141, and a digital signal for XY scanning to be performed in the next operation may be inputted from the computer 141 to the controller 142. A voltage or current signal may be applied to the first XYZ stage 131 from a digital-to-analog converter (DAC) of the controller 142 to perform XY scanning. Here, an XY position of the first XYZ stage 131 may be transmitted to the computer 141 from the controller 142 to be stored in the computer 141. The computer 141 may obtain a light intensity graph according to the XY position. Lastly, the computer 141 may store XY coordinates $(x^{UL}, y^{UL})$ where maximum optical coupling occurs, based on the obtained light intensity graph.

In the same way, the optical coupling apparatus 100 may move the first XYZ stage 131 to a preset initial position in order to optically couple the first SMF SMF1 and the RGC_LR 154 with each other. Thereafter, the optical coupling apparatus 100 may obtain and store XY coordinates $(x^{LR}, y^{LR})$ where the maximum optical coupling occurs in the same way as described above. The optical coupling apparatus 100 may move the first XYZ stage 131 in a direction opposite to the chip by a proper distance in order to avoid interference with the second XYZ stage 132.

In operation 220, the optical coupling apparatus 100 may identify, by using a pair of the second RGCs 152 and 153 different from the first RGCs 151 and 154 in an XY scanning process of the second XYZ stage 132, a second coordinate pair on the Si-PIC chip 150 that allows maximum optical coupling to occur with respect to a second SMF SMF2 and each of the second RGCs 152 and 153.

Specifically, the optical coupling apparatus 100 may move the second XYZ stage 132 to a preset initial position in order to optically couple the second SMF SMF2 and the RGC_UR 152 with each other. The unpolarized optical signal having a wide wavelength band outputted from the light source 110 may be inputted to a second OCIR OCIR2 to be inputted to the Si-PIC chip 150 through the second SMF SMF2.

The optical signal reflected from the Si-PIC chip 150 may be inputted to the PD 120 through the second SMF SMF2 and the second OCIR OCIR2 again. The optical power measured by the PD 120 may be stored in the computer 141, and a digital signal for XY scanning to be performed in the next operation may be inputted from the computer 141 to the controller 142. A voltage or current signal may be applied to the second XYZ stage 132 from the DAC of the controller 142 to perform XY scanning. Here, an XY position of the second XYZ stage 132 may be transmitted to the computer 141 from the controller 142 to be stored in the computer 141. The computer 141 may obtain a light intensity graph according to the XY position. Lastly, the computer 141 may store XY coordinates ($x^{UR}$, $y^{UR}$) where maximum optical coupling occurs, based on the obtained light intensity graph.

In the same way, the optical coupling apparatus 100 may move the second XYZ stage 132 to a preset initial position in order to optically couple the second SMF SMF2 and the RGC_LL 153 with each other. Thereafter, the optical coupling apparatus 100 may obtain and store XY coordinates ($x^{LL}$, $y^{LL}$) where the maximum optical coupling occurs in the same way as described above.

In operation 230, the optical coupling apparatus 100 may determine a first angle $\theta_1$ between the first XYZ stage 131 and the Si-PIC chip 150 by using the first coordinate pair identified through the computer 141, and may determine a second angle $\theta_2$ between the second XYZ stage 132 and the Si-PIC chip 150 by using the identified second coordinate pair.

In operation 240, the optical coupling apparatus 100 may generate, by applying a rotation matrix reflecting the determined first and second angles to a first LUT including layout coordinates for a plurality of optical devices disposed on the Si-PIC chip 150, a second LUT including coordinates of the first XYZ stage 131 and the second XYZ stage 132 for the plurality of optical devices.

In operation 250, the optical coupling apparatus 100 may position the first SMF SMF1 and the second SMF SMF2 at input and output GCs of #1 to #N optical devices disposed on the Si-PIC chip 150 by controlling the first XYZ stage 31 and the second XYZ stage 132 based on the generated second LUT, thereby completing optical coupling.

Figure 3:
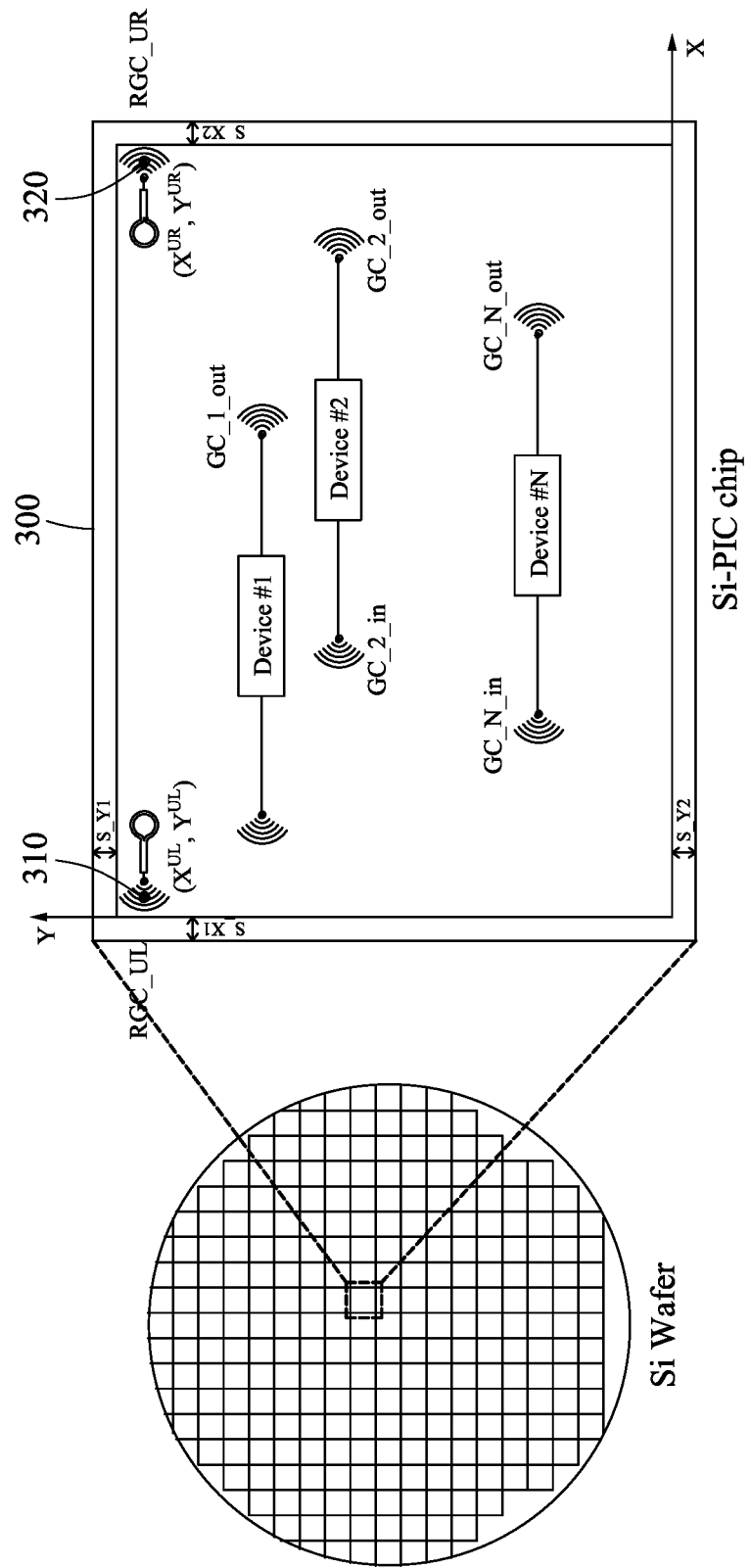
FIG. 3 is a diagram illustrating an optical coupling method applicable to a wafer scale according to an example embodiment.

FIG. 3 is a diagram illustrating an optical coupling method applicable to a wafer scale according to an example embodiment.

Referring to FIG. 3, the optical coupling method according to example embodiments may be also applied to the wafer scale. An Si-PIC chip 300 of FIG. 3 may include two RGCs (RGC_UL 310 and RGC_UR 320). Here, the two RGCs (RGC_UL 310 and RGC_UR 320) may correspond to the first XYZ stage and the second XYZ stage, respectively.

Since the same Si-PIC chip 300 is repeated, the wafer may use the RGCs (RGC_UL 310 and RGC_UR 320) of the Si-PIC chip 300 adjacent to each other as optical alignment marks.

That is, the optical coupling method illustrated in FIGS. 1A to 1G may perform optical alignment using four different RGCs disposed at diagonal positions inside one Si-PIC chip 150, but the optical coupling method illustrated in FIG. 3 may reduce the number of RGCs for optical alignment by half by performing optical alignment using adjacent Si-PIC chips 300 in which two RGCs are disposed.

FIGS. 4A to 4D are diagrams illustrating another example of an optical coupling method according to an example embodiment.

Referring to FIGS. 4A to 4D, the optical coupling method according to example embodiments may be applied when optical alignment is performed on an Si-PIC chip 450 and an optical fiber array block (FAB) for manufacturing an optical packaging module. A significant difference between the present example embodiment and other example embodiments is that a motorized rotation stage 460 is additionally required for optical alignment setup.

Figure 4A:
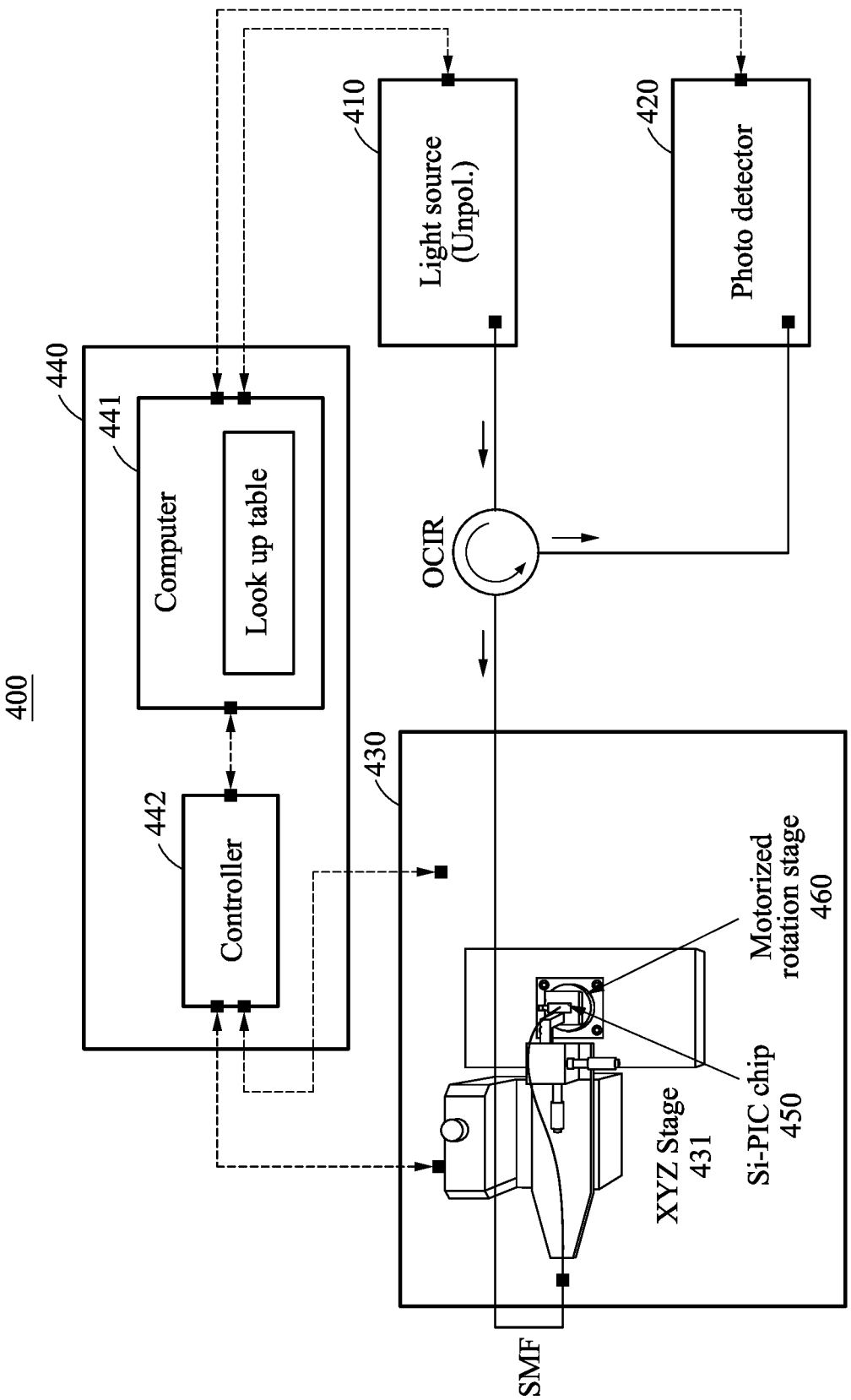
Figure 4C:
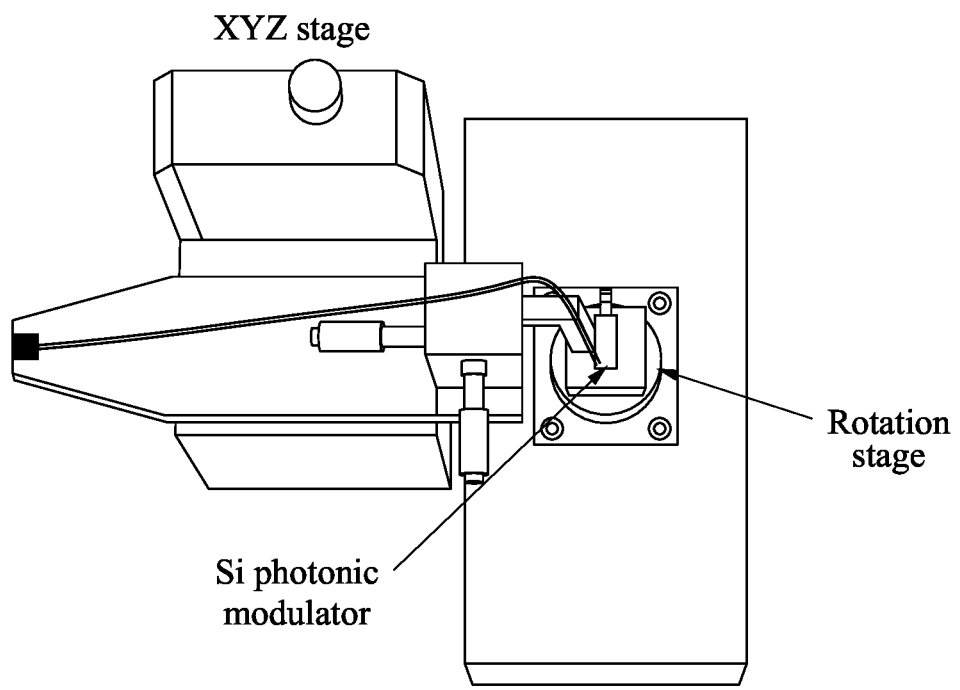

Specifically, FIG. 4A is a diagram illustrating a configuration of the optical coupling apparatus 400 for aligning the FAB to the Si-PIC chip 450. Referring to FIG. 4A, a SMF may be connected to one XYZ stage 431.

FIG. 4B is a diagram illustrating the Si-PIC chip 450 constituting the optical packaging module. Referring to FIG. 4B, in order to apply the optical coupling method according to example embodiments, two RGCs, that is, RGC_UL 451 and RGC_LR 452, may be disposed on the Si-PIC chip 450. In the Si-PIC chip 450, input and output GCs (GC_1_in, GC_1_out, GC_2_in, GC_2_out, . . . , GC_N_in, GC_N_out) for N optical devices to be optically coupled with the FAB may be disposed in a line to be respectively connected to the optical devices (Device #1 to Device #N).

First, the optical coupling apparatus 400 may obtain position information on the RGC_UL 451 and the RGC_LR 452 through XY scanning by using any one SMF included in the FAB, and may obtain an angle $\theta$ between the Si-PIC chip 450 and the XYZ stage 431.

Here, unlike the previous method, the optical coupling apparatus 400 may not update the coordinates through a rotation matrix reflecting the obtained angle $\theta$, but may rotate the motorized rotation stage 460 or an XYZ stage 431 such that the angle $\theta$ becomes "0" by means of the motorized rotation stage 460.

Figure 4D:
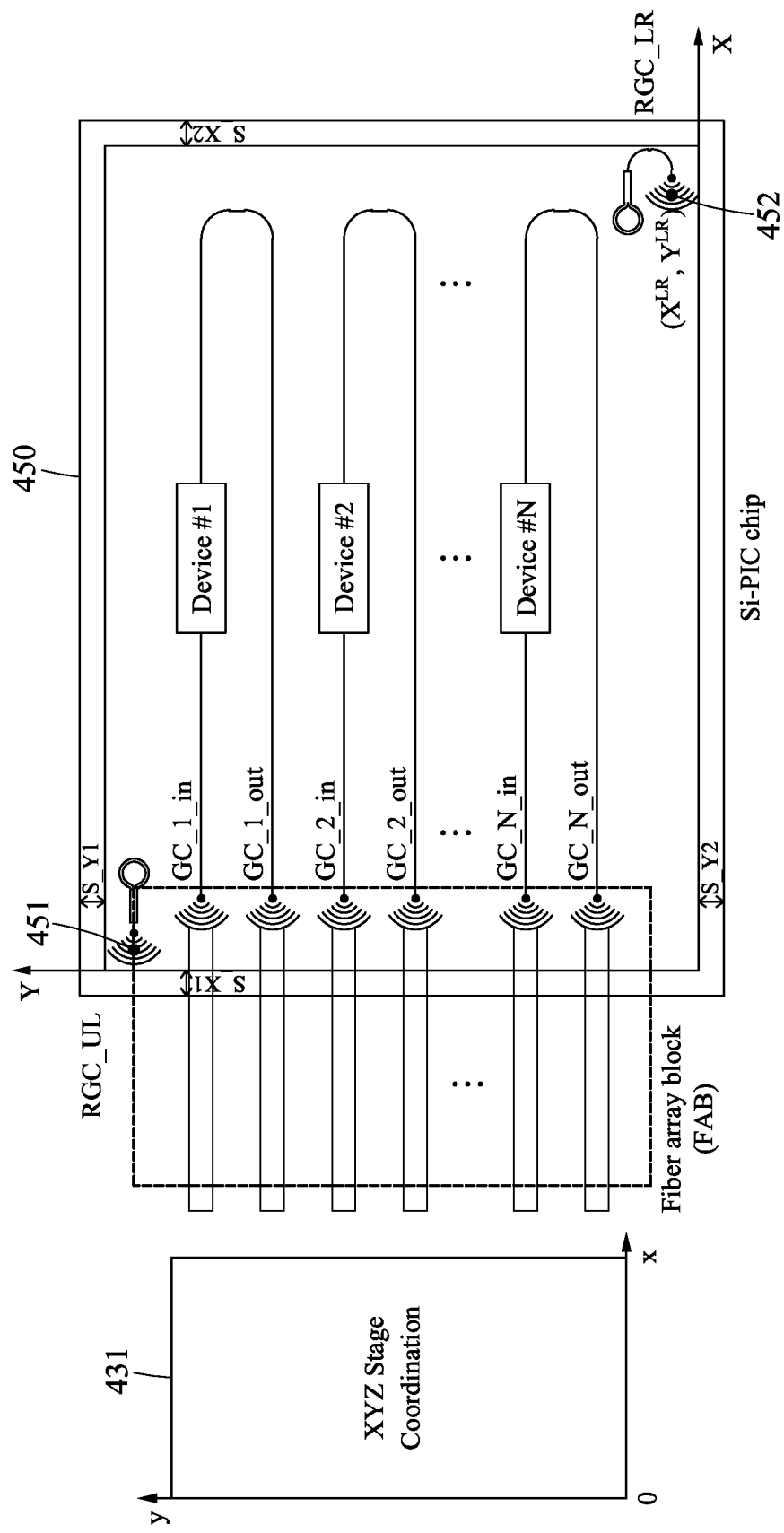

Thereafter, the optical coupling apparatus 400 may identify the position information on the RGC_UL 451 through XY scanning, and then may use an FAB XYZ stage (FIG. 4C) having the same coordinate system as the XYZ stage corresponding to the existing SMF, thereby performing optical alignment on the FAB and 2×N GC ports at once, as illustrated in FIG. 4D In other words, the optical coupling apparatus 400 identifying the position information on the RGC_UL 451 may be aware of the coordinates ($x^{UL}$, $y^{UL}$). Thus, assuming that the FAB XYZ stage has the same coordinate system as the XYZ stage corresponding to the existing SMF, alignment may be performed at once to a position to be coupled, by means of a coordinate position of ($x^{UL}$, $y^{UL}$).

Here, the optical coupling apparatus 400 may update a LUT for the GCs (GC_1_in, GC_1_out, GC_2_in, GC_2_out, . . . , GC_N_in, GC_N_out) by using the angle $\theta$ between the Si-PIC chip 450 and the XYZ stage 431, and the rotation matrix. Thereafter, for packaging, the Si-PIC chip 400 and the FAB may be bonded through an epoxy treatment.

Figure 5A:
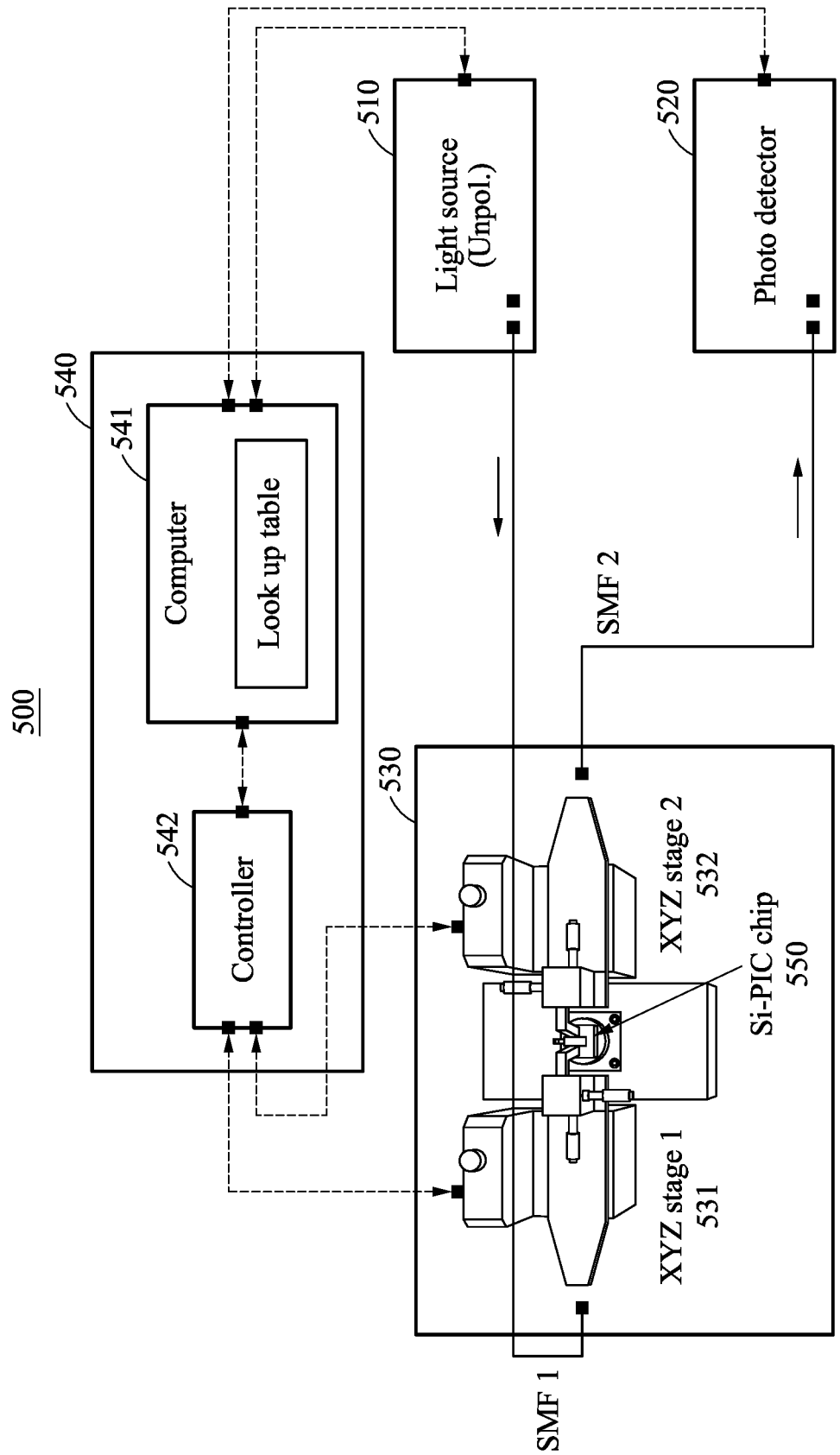
FIGS. 5A and 5B are diagrams illustrating an optical alignment system using a non-reflective grating coupler (GC) according to an example embodiment.
Figure 5B:
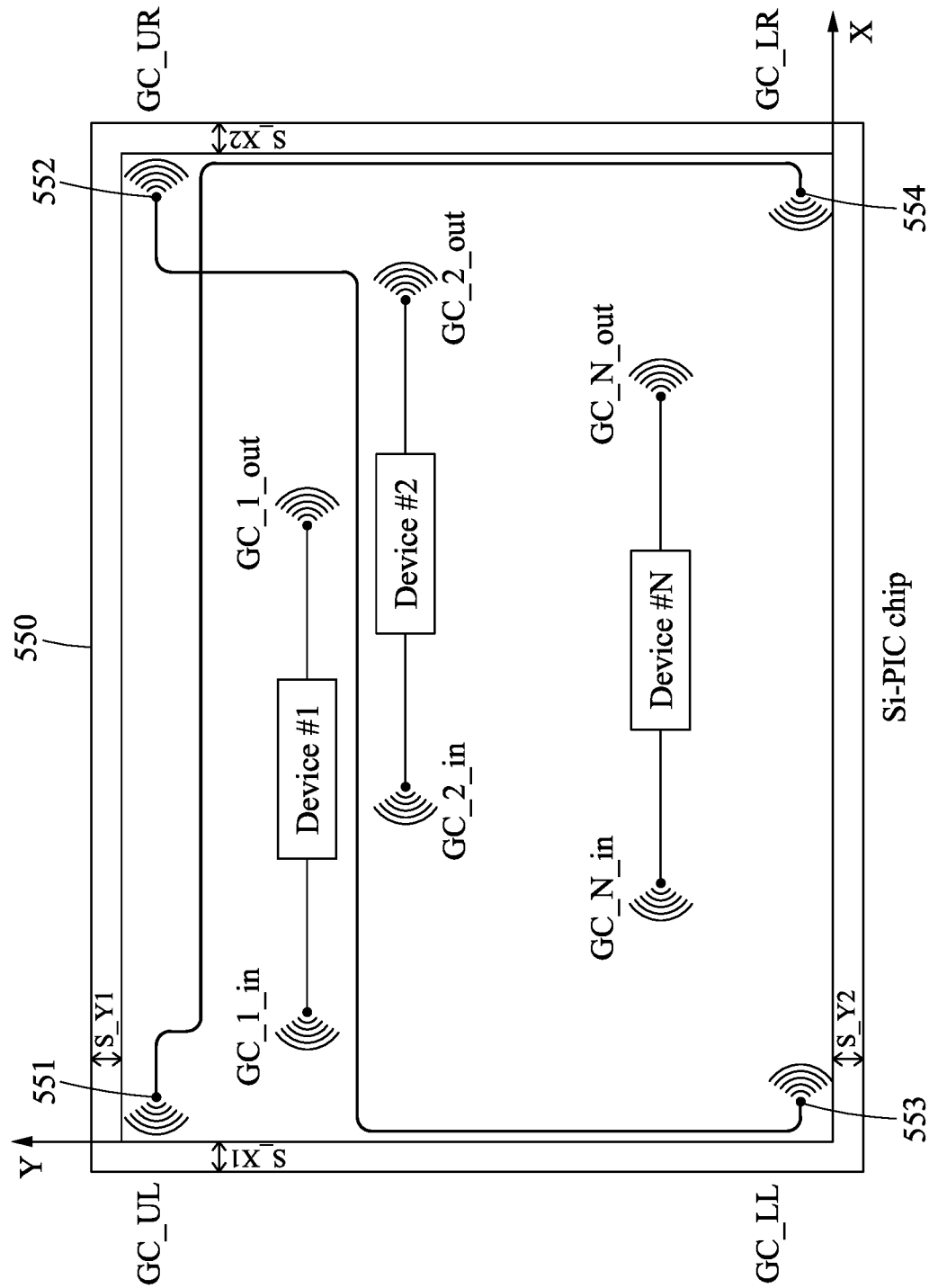

FIGS. 5A and 5B are diagrams illustrating an optical alignment system using a non-reflective GC according to an example embodiment.

First, when an RGC is not used, two non-reflective GCs may be used simultaneously, and thus optical alignment setup as illustrated in FIG. 5A may be required. A difference between FIG. 1A and FIG. 5A is that it is required to use not an OCIR, but two SMFs (SMF1 and SMF2) simultaneously as optical input and output ports. In the case of a non-reflective GC, light may not be reflected with only one non-reflective GC, and optical power may not be monitored by a PD. Therefore, both one input non-reflective GC and one output non-reflective GC may be required to input and output light, thereby allowing optical coupling.

As described above, the optical coupling method using a non-reflective GC may be structurally inefficient compared to the optical coupling method using an RGC. The optical coupling method using an RGC may allow optical alignment by performing XY scanning only once, but the optical coupling method using a non-reflective GC may have a shortcoming in that it is required to perform optical alignment for each of the two non-reflective GCs.

FIG. 5B is a diagram illustrating a configuration of a Si-PIC chip 550 in the case of using general non-reflective GCs, that is, GC_UL 551, GC_UR 552, GC_LL 553, and GC_LR 554 as optical alignment devices. Here, the GC_UL 551 may be diagonally connected to the GC_LR 554 by means of a silicon waveguide, and the GC_UR 552 may be diagonally connected to the GC_LL 553 by means of the silicon waveguide.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, that is, a computer program tangibly embodied in an information carrier, for example, in a machine-readable storage device (for example, a computer-readable medium) or in a propagated signal for processing by, or to control an operation of a data processing apparatus, for example, a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. In general, a processor will receive instructions and data from a read-only memory or a random access memory or both. Elements of a computer may include at least one processor to execute instructions and one or more memory devices to store instructions and data. In general, a computer will also include or be coupled to receive data from, transfer data to, or perform both on one or more mass storage devices to store data, for example, magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), and the like, and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

In addition, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that example embodiments disclosed herein are merely illustrative and are not intended to limit the scope of the invention. It will be apparent to those skilled in the art that various modifications of the example embodiments may be made without departing from the spirit and scope of the claims and their equivalents.

What is claimed is:

1. An optical coupling method comprising:
    identifying, by using a pair of first reflective grating couplers (RGCs) disposed on a silicon photonics chip in an XY scanning process of a first stage, a first coordinate pair on the silicon photonics chip that allows maximum optical coupling to occur with respect to a first optical fiber and each of the first RGCs;
    identifying, by using a pair of second RGCs different from the first RGCs in an XY scanning process of a second stage, a second coordinate pair on the silicon photonics chip that allows maximum optical coupling to occur with respect to a second optical fiber and each of the second RGCs;
    determining a first angle between the first stage and the silicon photonics chip by using the identified first coordinate pair, and determining a second angle between the second stage and the silicon photonics chip by using the identified second coordinate pair; and
    generating, by applying the determined first angle and second angle to a first lookup table (LUT) comprising layout coordinates for a plurality of optical devices disposed on the silicon photonics chip, a second LUT comprising coordinates of the first stage and the second stage for the plurality of optical devices.

2. The optical coupling method of claim 1, wherein the identifying of the first coordinate pair comprises, when an optical signal outputted through a light source in the XY scanning process of the first stage is reflected by each of the first RGCs on the silicon photonics chip and received by a photodiode, determining points on the silicon photonics chip having a largest received optical signal intensity as the first coordinate pair.

3. The optical coupling method of claim 1, wherein the identifying of the second coordinate pair comprises, when an optical signal outputted through a light source in the XY scanning process of the second stage is reflected by each of the second RGCs on the silicon photonics chip and received by a photodiode, determining points on the silicon photonics chip having a largest received optical signal intensity as the second coordinate pair.

4. The optical coupling method of claim 1, wherein the generating of the second LUT comprises applying a rotation matrix reflecting the determined first angle and second angle to the first LUT.

5. The optical coupling method of claim 1, wherein each of the first RGCs and the second RGCs is disposed on the silicon photonics chip such that distances are the furthest.

6. The optical coupling method of claim 1, further comprising:
performing optical coupling by positioning the first optical fiber and the second optical fiber at input and output grating couplers (GCs) for a plurality of optical devices disposed on the silicon photonics chip by controlling the first stage and the second stage through the generated second LUT.

7. An optical coupling method for a wafer in which a plurality of silicon photonics chips are arranged adjacently, the optical coupling method comprising:
identifying, by using one first RGC disposed on any first silicon photonics chip constituting the wafer and a second RGC disposed on a second silicon photonics chip adjacent to the first silicon photonics chip in an XY scanning process of a first stage, a first coordinate on the first silicon photonics chip and a second coordinate on the second silicon photonics chip that allow maximum optical coupling to occur with respect to a first optical fiber and each of the first RGC and the second RGC;
identifying, by using one third RGC disposed on the first silicon photonics chip and one fourth RGC disposed on the second silicon photonics chip adjacent to the first silicon photonics chip in an XY scanning process of a second stage, a third coordinate on the first silicon photonics chip and a fourth coordinate on the second silicon photonics chip that allow maximum optical coupling to occur with respect to the second optical fiber and each of the third RGC and the fourth RGC;
determining a first angle between the first stage and the wafer by using the identified first coordinate and second coordinate, and determining a second angle between the second stage and the wafer by using the identified third coordinate and fourth coordinate; and
generating, by applying the determined first angle and second angle to a first LUT comprising layout coordinates for a plurality of optical devices disposed on a silicon photonics chip constituting the wafer, a second LUT comprising coordinates of the first stage and the second stage for the plurality of optical devices.

8. The optical coupling method of claim 7, wherein the identifying of the first coordinate and the second coordinate comprises, when an optical signal outputted through a light source in the XY scanning process of the first stage is reflected by each of the first RGC and the second RGC and received by a photodiode, determining points on the silicon photonics chip having a largest received optical signal intensity as the first coordinate and the second coordinate.

9. The optical coupling method of claim 7, wherein the identifying of the third coordinate and the fourth coordinate comprises, when an optical signal outputted through a light source in the XY scanning process of the first stage is reflected by each of the third RGC and the fourth RGC and received by a photodiode, determining points on the silicon photonics chip having a largest received optical signal intensity as the third coordinate and the fourth coordinate.

10. The optical coupling method of claim 7, wherein the generating of the second LUT comprises applying a rotation matrix reflecting the determined first angle and second angle to the first LUT.

* * * * *